United States Patent [19]

Dunwoody

[11] Patent Number: 5,011,180
[45] Date of Patent: Apr. 30, 1991

[54] DIGITAL SUSPENSION SYSTEM

[75] Inventor: Andrew B. Dunwoody, Richmond, Canada

[73] Assignee: The University of British Columbia, Canada

[21] Appl. No.: 473,748

[22] Filed: Feb. 2, 1990

[51] Int. Cl.$^5$ ............................................. B60G 13/08
[52] U.S. Cl. .................................... 280/707; 280/714; 188/297
[58] Field of Search ............... 280/702, 708, 711, 709, 280/714; 188/295, 297, 290, 296, 269, 314

[56] References Cited

U.S. PATENT DOCUMENTS

| | | | |
|---|---|---|---|
| 2,683,598 | 7/1954 | Gazley | 188/269 |
| 4,037,860 | 7/1977 | Thiele | 280/714 |
| 4,162,091 | 7/1979 | Sano | 280/702 |
| 4,333,668 | 6/1982 | Hendrickson et al. | |
| 4,602,481 | 7/1986 | Robinson | |
| 4,639,013 | 1/1987 | Williams et al. | |
| 4,655,440 | 4/1987 | Eckert | 280/714 |
| 4,753,328 | 6/1988 | Williams | |

FOREIGN PATENT DOCUMENTS

| | | | |
|---|---|---|---|
| 1230657 | 12/1987 | Canada | |
| 1243964 | 7/1986 | U.S.S.R. | 188/314 |

Primary Examiner—Charles A. Marmor
Assistant Examiner—Karin Tyson
Attorney, Agent, or Firm—C. A. Rowley

[57] ABSTRACT

A digital suspension for a wheeled vehicle incorporates digital hydraulic actuators at each wheel and includes a system for sensing lateral and longitudinal accelerations of a body portion of the vehicle and the position of each wheel relative to the body provides this information to a computer. The computer computes the forces required at each wheel and controls the digital hydraulic actuator at each wheel by adjusting in increments the force applied at each actuator between the wheel and the body to maintain the body portion of the vehicle in a substantially stable position.

7 Claims, 4 Drawing Sheets

DIGITAL SUSPENSION SYSTEM

FIELD OF THE INVENTION

The present invention relates to a hydraulic suspension system. More particularly the present invention relates to a digital force adjusting computer controlled hydraulic suspension system.

BACKGROUND OF THE PRESENT INVENTION

The use of computers to control hydraulic systems in the suspension of motor vehicles has been discussed and various arrangements for controlling the suspension and for construction of the hydraulic actuator have been described and patented.

U.S. Pat. No. 4,333,668 issued Jun 8, 1982 to Hendrickson et al discloses a shock absorber with damping orifices that are controlled by solenoids which in turn are activated by a computer control in response to the rate of change of the extension of the absorber. Pitch and roll of the vehicle are also imposed on the control which energizes the solenoid to vary the opening and closing of the valves and maintain the vehicle substantially stable.

U.S. Pat. No. 4,639,013 issued Jan. 27, 1987 to Williams et al describes an active vehicle suspension incorporating a double acting hydraulic actuator in parallel with a gas spring. An actual change in load is sensed and an appropriate adjustment of the actuator is made to compensate for the sensed load change.

Canadian patent 1,230,657 issued Dec. 22, 1987 to Williams et al describes an active vehicle suspension system using hydraulic actuators for each wheel to generate signals in accordance with their displacements and forces applied thereto and controls the displacement of the hydraulic actuator in accordance with the interpretation of these signals to maintain vehicle stability.

U.S. Pat. No. 4,753,328 issued Jun. 28, 1988 to Williams is a further modification of the systems described in the preceding William's U.S. and Canadian patents and further discloses a damping system to selectively apply positive or negative damping to the movement of the pistons of the actuators.

Digital hydraulic actuators are also known. U.S. Pat. No. 4,602,481 issued Jul. 29, 1986 to Robinson describes a particular form of digital actuator utilizing piston areas of different sizes to selectively apply forces of a preselected magnitude. The force applied is controlled by adjusting the ratio of piston area subjected to the source pressure to that subjected to return pressure. The pressures may selectively be applied to force the actuator in opposite directions. By changing the piston area subjected to source (higher) pressure driving the actuator in one direction relative to the area under similar pressure driving the actuator in the opposite direction one can adjust the force to be positive in either direction and to have a selected value depending on the combination of areas subjected to source pressure or return pressure.

BRIEF DESCRIPTION OF THE PRESENT INVENTION

It is an object of the present invention to provide a suspension system for wheeled vehicles wherein the force between the body of the vehicle and each wheel is adjusted independent of displacement of the actuator to maintain the stability of the vehicle.

Broadly the present invention relates to a suspension system for a wheeled vehicle having a body portion comprising means for sensing lateral and longitudinal acceleration of said body portion, a digital hydraulic actuator supporting said body portion from each of said wheels, each said actuator including a plurality of different effective area actuator sections, a first source of hydraulic fluid at a first pressure, a second source of hydraulic fluid at a second pressure, said second pressure being different from said first pressure, valve means for selectively connecting said first and said second sources to selected of said actuator sections thereby to vary the amount of said effective area of said actuator subjected to said first and said second pressures to vary the force applied by each said actuator independent of the extension of said actuator, computer means for controlling said valves to adjust the number of said actuator sections of each said digital hydraulic actuator subjected to said first and said second pressures based on anticipated forces at each said actuator as determined by said computer means based on conditions sensed by said means for sensing lateral and longitudinal acceleration thereby to maintain said body portion substantially stable.

Preferably means to measure the displacement of each said actuator will provide a signal representing the displacement of each said actuator to said computer means and said computer means will control said valves to tend to maintain said actuator means in a position wherein said each said actuator has a preselected degree of extension.

Preferable the hydraulic actuator comprises a housing, a rotor extending through said housing, a plurality of axially radially projecting circumferentially spaced lugs on said housing and defining a plurality of circumferentially extending spaces therebetween, a pair of circumferentially opposed surfaces on an adjacent pair of said lugs defining opposite circumferentially spaced ends of each of said spaces, each of surfaces of said pairs of opposed surfaces of an adjacent pair lugs having different areas, axially extending radially projecting spaced bosses on said rotor, each said boss being received within a different one of said spaces and dividing its respective said space into a pair of actuator sections one on each side of said boss, each said boss having each of its radial circmferentially spaced sides substantially the same area as its adjacent opposed surface of said lug forming the adjacent circumferential end of said space in which it is received, said lugs having end faces cooperating with said rotor and said bosses having surfaces cooperating with circumferentially extending surfaces of said spaces to seal one said actuator section of said pair of sections in said space in which said boss is received from the other of said pair of actuator sections, said rotor being rotatably mounted within said housing so that each boss may rotate within its respective space through a preselected angle of rotation and means for directing fluid under preselected pressures into each of said actuator sections.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
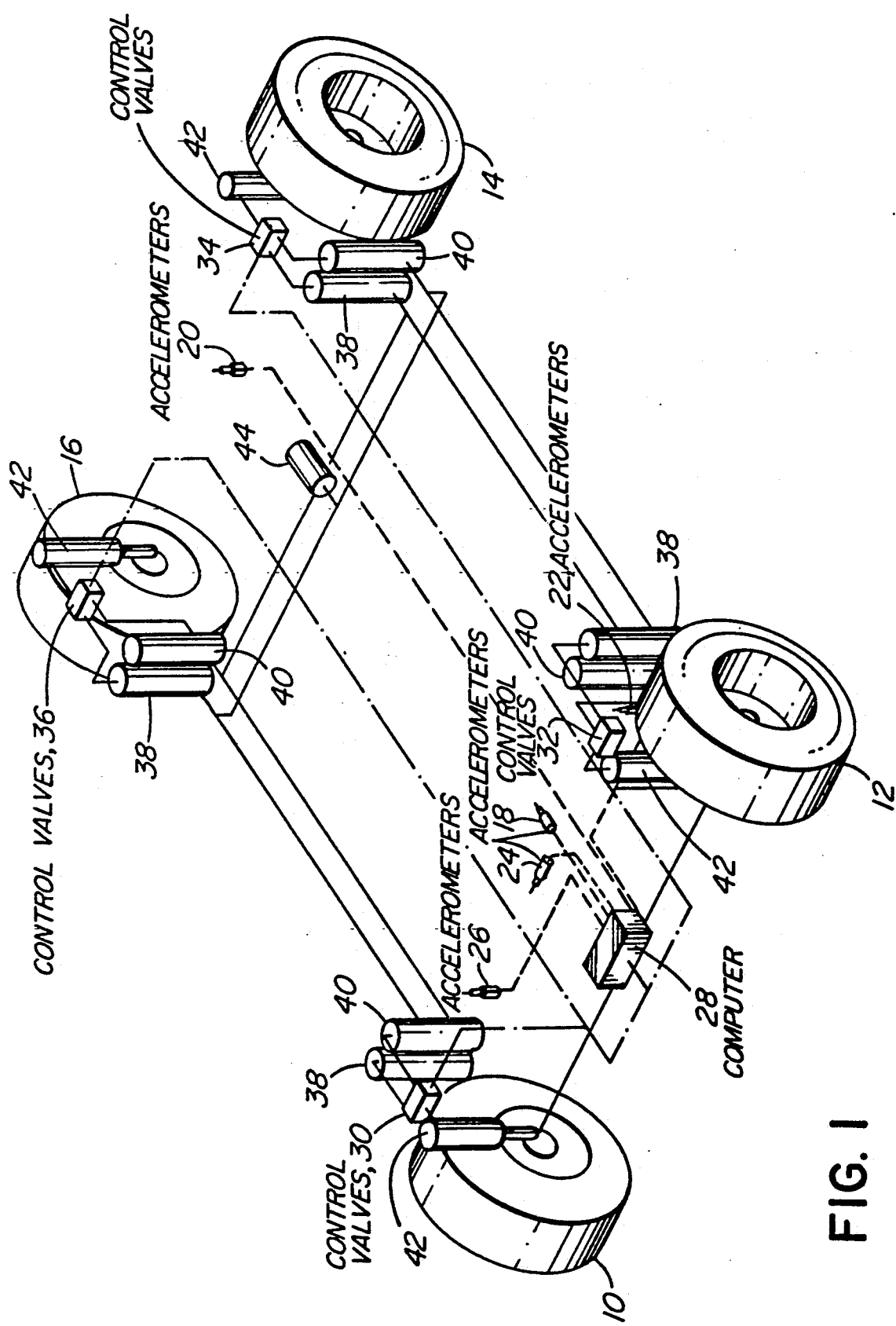
FIG. 1 is a schematic illustration of a wheeled vehicle illustrating a suspension system constructed in accordance with the present invention.

In the illustration of FIG. 1 the system of the present invention is applied to a four wheeled vehicle having wheels 10, 12, 14 and 16 each of which is supported from chassis (not shown in FIG. 1.) The system includes a plurality of accelerometers measuring the verticle, lateral and fore and aft acceleration of the vehicle as well as the pitch and roll. In the illustrated system five accelerometers indicated at 18, 20, 22, 24 and 26 have been provided. The accelerometer 18 measures fore and aft acceleration, the accelerometer 20 measures vertical acceleration at one end of the vehicle, accelerometers 22 and 26 measure vertical acceleration at opposite sides of the vehicle and the accelerometer 24 measures horizontal lateral acceleration. Each of the accelerometers 18 to 26 inclusive as above described transmit signals representing measured accelerations to the control computer or controller 28. The controller 28 in turn sends signals to each of the control valves systems 30, 32 and 34 and 36 (each of which is composed of a plurality of valves as will be described below) used to control the hydraulic actuator 42 (57 and 200) at each of the wheels 10, 12, 14 and 16 respectively, The hydraulic circuits for each of the actuators 42 in the illustrated arrangement include a high pressure tank 38 and a low pressure tank 40 which are connected to the valve systems 30, 32, 34, 36 which control the forces generated by the digital hydraulic actuator 42 at each of the wheels 10, 12, 14 and 16 respectively. The actuators 42 will be described in more detail hereinbelow with respect to actuators 57 and 200 shown in FIGS. 4 and 6 respectively.

In the illustrated arrangement the hydraulic pump 44 supplies high pressure $P_H$ fluid to the high pressure cylinders 38 and maintains the low pressure cylinders 40 at a significantly lower pressure $P_L$.

Figure 6:
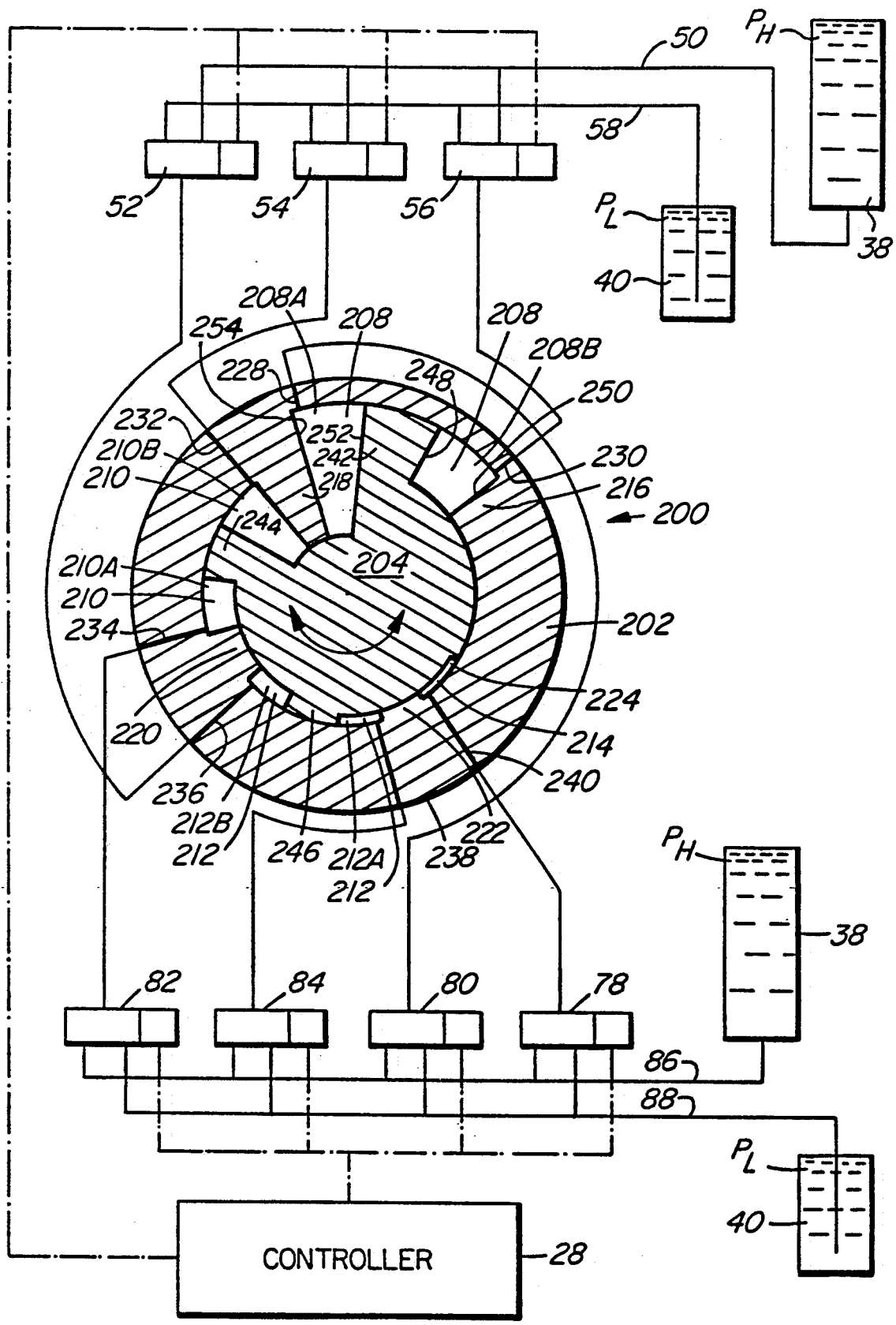
FIG. 6 is a schematic radial cross sectional illustration of a preferred hydraulic actuator.

Any suitable type of hydraulic actuator provided it is digital hydraulic actuator permitting adjustment of applied force independently of extension may be used. Obviously the computer control 28 will operate the valves for actuators 42 in accordance with the type of digital hydraulic actuator employed, in particular, the control will be different if a single acting actuator (force applied in a single direction only) is used than when a double acting actuator (force applied in two opposite directions) is used. Examples of the two different types are shown in FIGS. 4 and 6.

Figure 2:
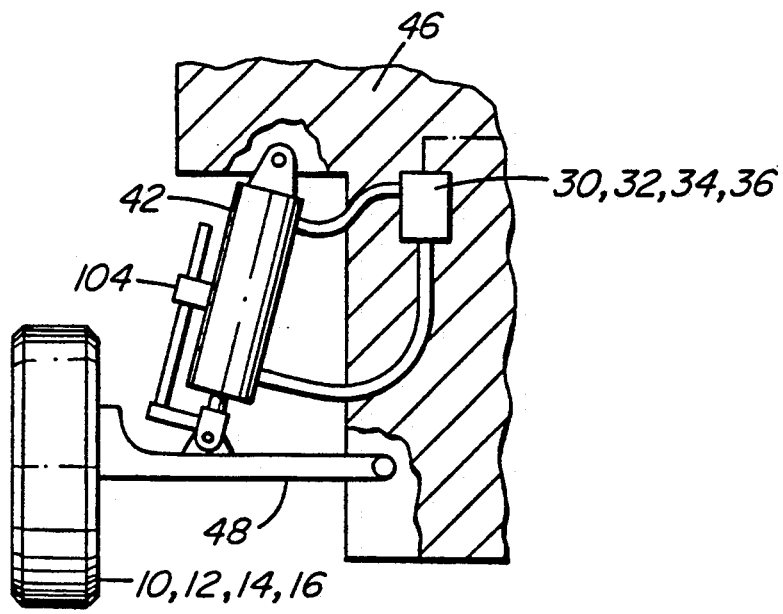
FIG. 2 is a schematic illustration of a digital hydraulic actuator in position supporting one of the wheels of the vehicle relative to the chassis.
Figure 3:
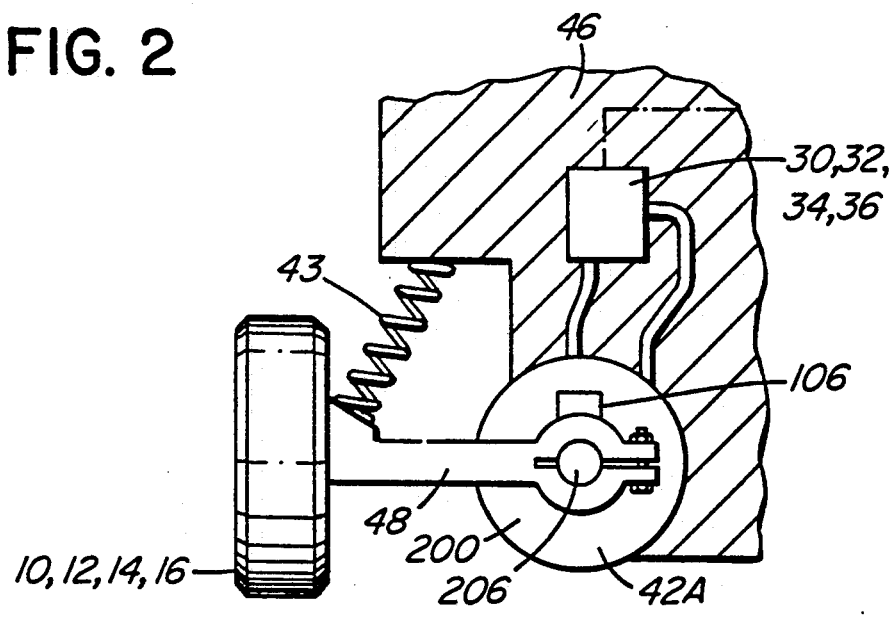
FIG. 3 is a view similar to FIG. 2 but illustrating a preferred form of hydraulic actuator.

An example of the mounting of an axially acting hydraulic actuator is shown in FIGS. 2. In FIG. 2 a piston and cylinder type actuator 42 (FIG. 4) which changes its axial or longitudinal extension between the body 46 and the suspension 48 to which the wheel (10, 12, 14 or 16) is mounted has been shown. In FIG. 3 a torque type digital actuator 42A (e.g. the double acting torque type actuator 200 in FIG. 6) has been shown interposed between the body 46 and the suspension 48 for each wheel (10, 12, 14 and 16.) The actuator 42 (or 42A) may be a single or a double acting actuator, a single acting axial extension actuator is shown in FIG. 4 (actuator 57) and a double acting axial extension actuator is shown in said U.S. Pat. No. 4,602,481.

Generally when a double acting actuator is used as is preferred a suitable suspension spring such as that illustrated at 43 will be used in parallel with the digital hydraulic actuator to support the body 46 at each of the wheels (10, 12, 14 and 16.)

Figure 4:
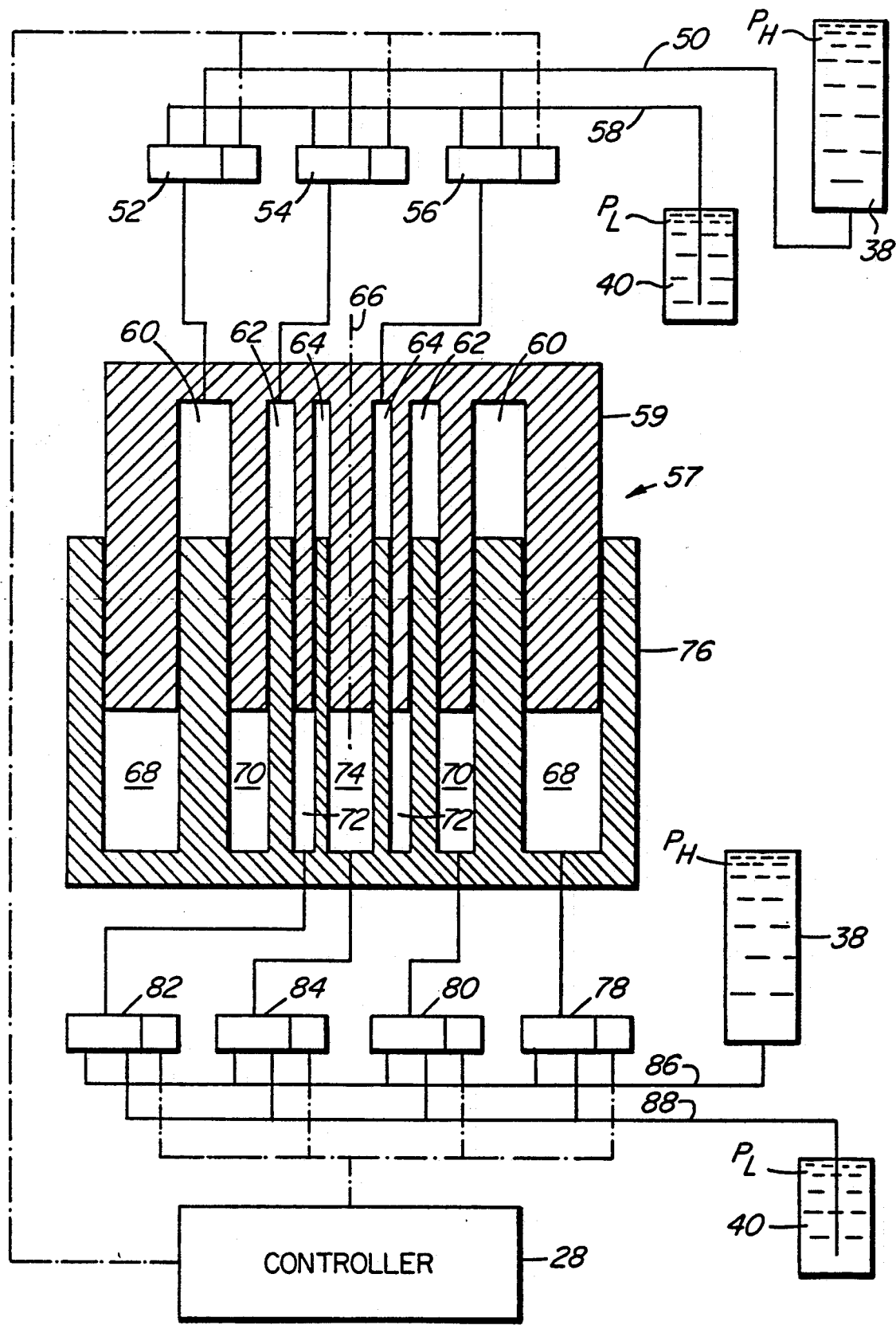
FIG. 4 is a schematic illustration of one form of hydraulic actuator that may be used with the present invention.

A single acting piston and cylinder type actuator 57 has been illustrated in FIG. 4. In this system two high pressure sources 38 have been shown; one for the actuator sections of the upper portion 59 of the actuator 57 and one for the actuator sections in the lower portion 76 of the actuator. The description below will only refer to a high pressure source 38 and a low pressure source 40 as separate sources need not be provided for each section. The source 38 is at a pressure $p_H$ whereas the low pressure reservoir or source 40 is at a lower pressure $p_L$.

The high pressure source 38 is connected via a manifold 50 with valves 52, 54 and 56 which will form part of each the valve system 30, 32, 34 or 36. These valves are also connected via a low pressure manifold 58 with the low pressure reservoir 40. Each of valve 52, 54 and 56 is connected respectively to actuator sections in this case formed by annular, concentric chambers 60, 62 and 64 respectively in the upper portion 59 of the actuator 57. The chambers or sections 60, 62 and 64 have different effective cross sectional areas measured in a plane radial to the axis 66 around which the chambers, 60, 62 and 64 are concentric.

Similarly the annular ring dividers separating the chambers or sections 60, 62 and 64 are received within a second set of annular chambers 68, 70, 72 and 74 concentric with the axis 66 formed in second or bottom section 76 of the actuator 57.

The effective cross sectional areas of the sections 60, 62, 64, 68, 70, 72 and 74 are related such that for example the effective area of chamber 60 is preferably twice that of chamber 62 and chamber 62 is twice that of chamber 64 etc., however it is not essential that the effective areas of these chambers be stepped in this manner but it is important that the areas be different.

Each of these chambers 60, 62 and 64 formed in the upper portion 59 of the actuator 57 is connected respectively to the valve 50, 52 and 56 while the chamber 68, 70, 72 and 74 in the lower section 76 are connected to valves, 78, 80, and 82 respectively (there are valves 78, 80, 82 in each of the valve systems 30, 32, 34 or 36) which valves are connected via a high pressure manifold 86 to the high pressure reservoir 38 and via manifold 88 and the low pressure source or reservoir 40.

The controller 28 actuates each of the valves 52, 54, 56, 78, 80, 82 and 84 to connect the various sections 60, 62, 64, 68, 70, 72 and 74 either to the high pressure source 38 or the low pressure source 40 so that the total force tending to separate the two units 59 and 76 is governed by the sum of the forces in the cylinders 60, 62, 64, 68, 70, 72 and 74. The sum of these forces is dependent directly on the area of each chamber multiplied by the pressure in each chamber which pressures are selected as $P_H$ or $P_L$ depending on which source of fluid is connected thereto.

Figure 5:
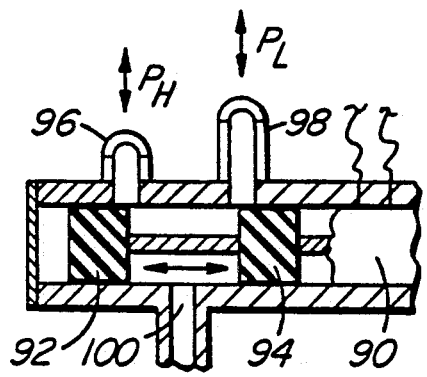
FIG. 5 is a schematic illustration of a control valve that may be used to control the pressure applied to sections of the actuator.

The valves 52, 54, 56, 78, 80, 82 and 84 may be any suitable valve connecting the actuator section to one pressure source or the other, however the operation of the system will be described with respect to the valve shown in FIG. 5. In this system the valve has a control solenoid indicated at 90 which may be any suitable solenoid or the like to move the body of the valve, formed by two interconnected cylinders 92 and 94, back and forth to open and close the two inlet ports 96 and 98, one for high pressure (96) and one for low pressure (98). Intermediate port 100 connects the valve to its respective section or chamber 60, 62, 64, 68, 70, 72 or 74. It will be apparent that as the valve moves to close off say port 96 and open port 98 it opens port 98 before it totally closes off port 96 as indicated by the dimension x. Obviously a similar phenomena occurs when the valve is moved in the opposite direction to close off port 98 and open port 96. The rate of movement of the cylinders 92 and 94 to open and close the ports 96 and 98 is relatively rapid, thus the time period in which both ports are simultaneously cracked open in small and is provides to ensure that there is no significant build up of pressure during the transition between the high and low pressure sources.

It will be apparent that any of the cylinders 60, 62, 64, 68, 70, 72, and 74 may be connected either to the low pressure source 40 or the high pressure source 38. If the ratio of effective areas in the various sections of chambers, i.e. the effective cross sectional areas of the chambers are in multiples of two a convenient stepping of the pressures applied tending to force the two sections 59 and 76 apart can be established by appropriately connecting the various chambers to the high pressure source $p_H$ or the low pressure source $p_L$.

Each of the sources $p_H$ and $p_L$ are substantially contant pressure sources in that they maintain a substantially constant pressure e.g. by a pneumatic pressure at the top of the fluid so that the amount of flow fluid does not significantly affect the pressure. The low pressure $p_L$ may simply be atmospheric pressure.

The pressure sources 38 and 40 are of the type that maintain essentially the same pressure to the valves substantially irrespective of the flow to or extension of the actuator e.g. separation of the portions 59 and 76 of actuator 57 or as will be described below relative rotation of the rotor and housing of FIG. 6, for example by maintaining substantially constant pneumatic pressures in the reservoirs 38 and 40.

Control of the valves 52, 54, 56, 78, 80, 82 or 84 to direct the appropriate pressure into the various chambers 60, 62, 64, 68, 70, 72 or 74 is by the computer controller 28 and is based on the anticipated movement of the chassis as determined by calculations based on the signals from the accelerometers 18, 20, 22, 24 and 26 to define the expected movement of the chassis relative to the wheels and using the weight and centre of gravity (assumed or determined) calculate the force required to resist movement of the body 46 at each of the wheels.

In order to calculate the forces involved so that the forces can be matched in the actuator, it is necessary not only to know the acceleration but also the weight and centre of gravity of the vehicle must be assumed or determined. Thus appropriate means may be provided in each of the suspension systems to determine the weight of the vehicle. This weight of the vehicle may easily be obtained based on the measured displacement of the suspension system e.g. the actuators 42 or 42A at each of the wheels 10, 12, 14 and 16 measured by a suitable measuring device such as that indicated at 104 in FIG. 2 or the angular position of the wheel by the measuring device as indicated at 106 in FIG. 3.

The signals from the accelerometers 18, 20, 22, 24 and 26, the signals from the actuator extension measurement devices on each wheel 104 or 106 and signals from such other measuring devices as may be used are presented to the controller or control computer 28. The control computer 28 calculates the force to be applied by each actuator and the positions of each of the valves 52, 54, 56, 78 80, 82 and 84 of each of the valve blocks 34.

In the preferred embodiment of the present invention, the force to be applied by each actuator is calculated as a weighted sum of the most recent, and preferably some preceding values of each of the accelerometer and extension signals. The weighting coefficients are determined using known modern linear control theory, preferably the Ricatti equation of optimal linear quadratic control theory, and a knowledge of the vehicle parameters. The parameters describing the vehicle include mass, mass moments of inertia and dimensions are programmed into the computer when the system is installed.

In a preferred case the vehicle parameters are identified from the accelerometer and extension signals and the actuator forces, for example a maximum likelihood method of parameter estimation from statistical theory may be applied to generate appropriate calculation procedures. In this case, the control computer would, in addition to calculating actuator forces, periodically perform the calculations to identify the parameters of the vehicle and perform the calculations to determine the weighting coefficients mentioned previously and in the manner compensate for different loading conditions of the vehicle. Normally the calculations of actuator forces will be repeated at least every 0.1 seconds while the calculations to determine weighting coefficients may be done less frequently preferable at least every 10 seconds.

Calculating the actuator force at least every 0.1 seconds is sufficiently rapid to respond to turning, acceleration and braking of the vehicle as well as to variations in the road surface over which the vehicle is travelling.

The prime function of the suspension system is to respond to variations in road surface, thereby to substantially isolate the body 46 from the road surface. However if the wheel is displaced too far from its nominal position (generally in about the middle of the wheel well) the suspension may reach the limit of its travel and a strong shock will be transmitted to the body 46. To avoid this the suspension must move the body 46 sufficiently to maintain suspension (wheel relative to the body) in its normal position. A stiff suspension hold the wheel near the normal position, but at the expense of a lot of road roughness being transmitted to the body 46, a soft suspension on the other hand permits freer movement of the wheel relative to the body 46 and better isolates the body from the road but at the expense of more likelihood of the suspension reaching the limits of its travel and transmitting shocks to the body. The computer control must control the active suspension system to provide the kind of suspension system selected and in any event must react at least as well as a conventional suspension system to prevent the suspension from reaching its limits and transmitting shocks to the body 46.

In the preferred embodiment of the present invention hydraulic actuator will be a torsional actuator as indicated at 200 in FIGS. 3 and 6. The torsional actuator has an outer housing 202 and a rotor 204 contained therein. Rotor 204 has an axially extending shaft 208 that is clamped to the suspension arm 48 for a wheel so that the angular position of the arm 48 relative to the body 46 is adjusted by rotating the rotor 204 relative to the housing 202.

The torsional actuator 200 shown in FIG. 6 also includes the same valve systems as with the axial actuator 57 and like parts have been indicated with like numerals in the FIGS. 4 and 6 embodiments. In the torsional actuator 200 a plurality of circumferentially extending spaces 208, 210, 212 and 214 are provided. The space 208 is formed between lugs 216 and 218, the space 210 between the lugs 218 and 220 and space 212 between the lugs 220 and 222. A further space 214 is formed between the lug 222 and a face 224 formed on the rotor 204.

The rotor 204 is provided with circumferentially spaced bosses 242, 244 and 246 which are circumferentially shorter than and are received within the spaces 208, 210 and 212 respectively and divide the spaces into actuator sections or chambers 208A, 208B; 210A, 210B; and 212A, 212B respectively.

In the illustrated arrangement the ports 228, 230 are provided leading to the sections 208A and 208B adjacent the lugs 218 and 216 respectively and are connected to the valves 80 and 56 respectively. Similarly the sections 210B and 210A are connected by ports 232 and 234 positioned adjacent the lugs 218 and 220 respectively to the valves 54 and 82 respectively. The sections 212B and 212A are connected by ports 236 and 238 positioned adjacent the lugs 220 and 222 to the valves 52 and 84 respectively. The space (section) 214 is connected via port 240 with the valve 78.

It will be noted that the face 248 of the boss 242 facing the face 250 on the abutment 216 have essentially the same effective area measured radially to the axis of rotation of the rotor 204. Similarly the faces 252 and 254 on the boss 242 and lug 218 are of the same radial area as are the adjacent faces on each of the respective adjacent lugs and bosses.

The periphery of the bosses 242, 244 and 246 are in wiping relationship with the circumferences of the spaces 208, 210 and 212 respectively and form a seal between the sections 208A and 208B: 210A and 210B; and 212a and 212B respectively. Similarly the lugs 216, 218, 220, 222 are in sealing relationship with the circumference of the rotor 204 to further seal sides of the various sections 208A and 208B: 210A and 210B; and 212A and 212B and 214.

It will be apparent that the area of the face 224 of the space 214 is substantially equal to the area of the facing surface of the lug 222. It can be seen that a plurality of different radial effective cross sectional area actuator sections are provided circumferentially spaced around the rotor. Preferably the radial area of the corresponding pairs of adjacent faces will be in a specific ratio to the areas of other corresponding pairs of radial areas so that the cross sectional areas subject to different pressures may be combined to produce the desired resultant force by selectively connecting the sections 208A, 208B, 210A, 210B, 212A, 212B and 214 to $P_H$ or $P_L$ via the valves 80, 56, 82, 54, 84, 52 and 78 respectively.

The torsional actuator 200 is a double acting actuator in that as viewed in FIG. 4 it may be used to apply pressure to tend to rotate the suspension 48 either in a clockwise or a counterclockwise under control of the computer 28 to maintain the suspension in the desired position relative to the body 46. A single acting actuator can only be manipulated to keep the suspension in its normal position by changing the magnitude but not the direction of the forces applied between each wheel and the body 46.

Having described the invention modifications will be evident to those skilled in the art without departing from the spirit of the invention as defined in the appended claims.

What is claimed is:

1. A suspension system for a wheeled vehicle having a body portion comprising means for sensing lateral and longitudinal acceleration of said body portion, a digital hydraulic actuator supporting said body portion from each of said wheels, each said actuator including a plurality of different effective area actuator sections, a first source of hydraulic fluid at a first pressure, a second source of hydraulic fluid at a second pressure, said second pressure being significantly different from said first pressure, valve means for selectively connecting either one or the other of said first and said second sources to selected of said actuator sections thereby to vary the number of said actuator sections and thereby the amount of said effective area of each said actuator subjected to said first and said second pressures to selectively vary the force applied by each said actuator independent of the extension of said actuator, computer means for controlling said valves to adjust the number of said actuator sections of each said digital hydraulic actuator subjected to said first and said second pressured based on anticipated forces at each said actuator as determined by said computer means based on conditions sensed by said means for sensing lateral and longitudinal acceleration thereby to maintain said body portion substantially stable.

2. A suspension system as defined in claim 1 further comprising means to measure the displacement of each said actuator to provide a signal representing the displacement of each said actuator to said computer means and said computer means controlling said valves to tend to maintain said actuator means in a position wherein said each said actuator has a preselected degree of extension.

3. A suspension system as defined in claim 2 wherein each said actuator is a double acting actuator.

4. A suspension system as defined in claim 1 wherein hydraulic actuator comprises a housing, a rotor extending through said housing, a plurality of axially extending radially projecting circumferentially spaced lugs on said housing and defining a plurality of circumferentially extending spaces therebetween, a pair of circumferentially opposed surfaces on an adjacent pair of said lugs defining opposite circumferentially spaced ends of each of said spaces, each of surfaces of said pairs of opposed surfaces of an adjacent pair lugs having different areas, axially extending radially projecting spaced bosses on said rotor, each said boss being received within a different one of said spaces and dividing its respective said space into a pair of said actuator sections one on each side of said boss, each said boss having each of its radial circmferentially spaced sides substantially the same area as its adjacent opposed surface of said lug forming the adjacent circumferential end of said space in which it is received, said lugs having end faces cooperating with said rotor and said bosses having surfaces cooperating with circumferentially extending surfaces of said spaces to seal one said actuator section of said pair of sections in said space in which said boss is received from the other of said pair of actuator sections, said rotor being rotatably mounted within said housing so that each boss may rotate within its respective space through a preselected angle of rotation and means for directing fluid under said first or said second pressure into each of said actuator sections.

5. A suspension system as defined in claim 2 wherein hydraulic actuator comprises a housing, a rotor extending through said housing, a plurality of axially extending radially projecting circumferentially spaced lugs on said housing and defining a plurality of circumferentially extending spaces therebetween, a pair of circumferentially opposed surfaces on an adjacent pair of said lugs defining opposite circumferentially spaced ends of each of said spaces, each of surfaces of said pairs of opposed surfaces of an adjacent pair lugs having different areas, axially extending radially projecting spaced bosses on said rotor, each said boss being received within a different one of said spaces and dividing its respective said space into a pair of said actuator sections one on each side of said boss, each said boss having each of its radial circmferentially spaced sides substantially the same area as its adjacent opposed surface of said lug forming the adjacent circumferential end of said space in which it is received, said lugs having end faces cooperating with said rotor and said bosses having surfaces cooperating with circumferentially extending surfaces of said spaces to seal one said actuator section of said pair of sections in said space in which said boss is received from the other of said pair of actuator sections, said rotor being rotatably mounted within said housing so that each boss may rotate within its respective space through a preselected angle of rotation and means for directing fluid under said first or said second pressure into each of said actuator sections.

6. A suspension system as defined in claim 3 wherein hydraulic actuator comprises a housing, a rotor extending through said housing, a plurality of axially extending radially projecting circumferentially spaced lugs on said housing and defining a plurality of circumferentially extending spaces therebetween, a pair of circumferentially opposed surfaces on an adjacent pair of said lugs defining opposite circumferentially spaced ends of each of said spaces, each of surfaces of said pairs of opposed surfaces of an adjacent pair lugs having different areas, axially extending radially projecting spaced bosses on said rotor, each said boss being received within a different one of said spaces and dividing its respective said space into a pair of said actuator sections one on each side of said boss, each said boss having each of its radial circmferentially spaced sides substantially the same area as its adjacent opposed surface of said lug forming the adjacent circumferential end of said space in which it is received, said lugs having end faces cooperating with said rotor and said bosses having surfaces cooperating with circumferentially extending surfaces of said spaces to seal one said actuator section of said pair of sections in said space in which said boss is received from the other of said pair of actuator sections, said rotor being rotatably mounted within said housing so that each boss may rotate within its respective space through a preselected angle of rotation and means for directing fluid under said first or said second pressure into each of said actuator sections.

7. A hydraulic actuator comprising a housing, a rotor extending through said housing, a plurality of axially extending radially projecting circumferentially spaced lugs on said housing and defining a plurality of circumferentially extending spaces therebetween, a pair of circumferentially opposed surfaces on an adjacent pair of said lugs defining opposite circumferentially spaced ends of each of said spaces, each of surfaces of said pairs of opposed surfaces of an adjacent pair lugs having different areas, axially extending radially projecting spaced bosses on said rotor, each said boss being received within a different one of said spaces and dividing its respective said space into a pair of actuator sections one on each side of said boss, each said boss having each of its radial circmferentially spaced sides substantially the same area as its adjacent opposed surface of said lug forming the adjacent circumferential end of said space in which it is received, said lugs having end faces cooperating with said rotor and said bosses having surfaces cooperating with circumferentially extending surfaces of said spaces to seal one said actuator section of said pair of sections in said space in which said boss is received from the other of said pair of actuator sections, said rotor being rotatably mounted within said housing so that each boss may rotate within its respective space through a preselected angle of rotation and means for directing fluid under preselected pressures into each of said actuator sections.

* * * * *